Patented June 21, 1938

2,121,331

UNITED STATES PATENT OFFICE 2,121,331

SUBSTITUTION PRODUCTS OF DIPHENYLENE OXIDE AND PROCESS OF PREPARING THEM

Karl Zahn and Kurt Schimmelschmidt, Frankfort-on-the-Main-Hochst, Germany, assignors to General Aniline Works, Inc., New York, N. Y., a corporation of Delaware No Drawing. Application February 15, 1937, Serial No. 125,936. In Germany February 19, 1936

6 Claims. (Cl. 260—54)

The present invention relates to substitution products of diphenylene oxide and to a process of preparing them; more particularly, it relates to compounds of the following general formula:

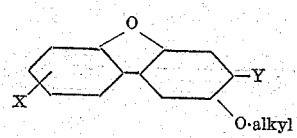

wherein X stands for a member of the group consisting of hydrogen, halogen, alkyl and alkoxy and Y for one of the group consisting of hydrogen, nitro and amino.

We have found that by causing nitrating agents to act upon 3-alkoxy-diphenylene oxides or substitution products thereof with free 2-position there are obtained in a practically uniform manner the hitherto unknown corresponding 2-nitro-compounds from which there are obtained by reduction the 2-amino-3-alkoxy-diphenylene oxides or the substitution products thereof. Thus, for instance, by treating 3-methoxy-diphenylene oxide with nitric acid in an organic solvent it is transformed into a new mononitro-compound which according to all reactions is the 2-nitro-3-methoxy-diphenylene oxide and yields by reduction by one of the usual methods the 2-amino-3-methoxy-diphenylene oxide.

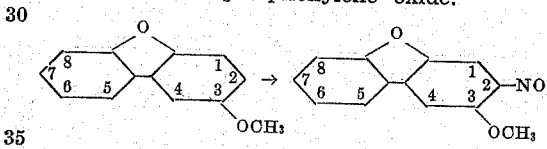

The reaction occurs in an analogous manner if the diphenylene oxide nucleus contains in 5-, 6-, 7- or 8-position further substituents for instance, halogen, alkyl- or alkoxy-groups.

The smooth and practically uniform course of the nitration could by no means be foreseen on account of the great number of possible positions of substitution.

The compounds used as parent materials for the process of this invention are obtained by alkylation of 3-hydroxy-diphenylene oxide or its substitution products which may easily be obtained for instance, by the process of U. S. application Serial No. 120,826, filed January 15, 1937, in the name of Karl Zahn and Kurt Schimmelschmidt for: "3-hydroxy-diphenylene oxides and process of preparing them".

The parent material may be nitrated in different manner, advantageously in the presence of an organic solvent since thereby practically pure products are obtained. The nitro-compounds obtainable by the invention are reduced to the corresponding amino-compounds in known manner, for instance, with catalytically activated hydrogen or with iron and hydrochloric acid.

The 2-amino-3-alkoxy-diphenylene oxides obtained and the substitution products thereof are valuable intermediates for the manufacture of dyestuffs.

The following examples serve to illustrate the invention, but they are not intended to limit it thereto; the parts are by weight:

(1) 455 parts of 3-methoxy-diphenylene oxide (obtainable by methylation of 3-hydroxy-diphenylene oxide with dimethyl sulfate in an alkaline solution; boiling point under a pressure of 10 mm.=172° C.; melting point=47° to 48° C.) are dissolved in 1000 parts of glacial acetic acid, and 240 parts of nitric acid (spec. grav. 1.4) are added in the cold. The reaction occurs with evolution of heat and the nitration product obtained separates in the form of yellow crystals. When the reaction is finished the whole is allowed to cool, filtered with suction and the product remaining on the filter is washed with methanol. 525 parts of a crude product melting at 175° C. to 183° C. are obtained. After recrystallization from chlorobenzene there are obtained 375 parts of pure 2-nitro-3-methoxy-diphenylene oxide in

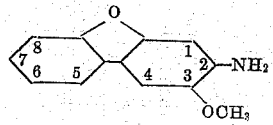

the form of yellow needles melting at 190° C. to 192° C. By concentrating the chlorobenzene mother-liquors there are obtained further quantities of the said nitro-compound.

100 parts of 2-nitro-3-methoxy-diphenylene oxide so obtained are introduced into a hydrogenation autoclave with 200 parts of methanol and a nickel catalyst and treated at 50° C. to 100° C. with hydrogen under pressure. When the absorption of hydrogen is finished the catalyst is eliminated by filtering the contents of the autoclave while hot. The colorless solution obtained is allowed to cool and the 2-amino-3-methoxy-diphenylene oxide crystallizes in the form of colorless crystals melting at 92° C.

(2) 20 parts of 3-methoxy-diphenylene oxide are dissolved in 200 parts of chlorobenzene and the solution is stirred together with 28 parts of nitric acid of specific gravity 1.4. With a slight evolution of heat the mixture becomes a yellow crystalline magma. When the reaction is finished the whole is filtered with suction and the product is washed with water. 19 parts of 2-nitro-3-methoxy-diphenylene oxide melting at 189° C. to 191° C. are obtained in a condition pure enough for being further worked up.

60 parts of 2-nitro-3-methoxy-diphenylene oxide are boiled, while stirring, for 20 hours in a reflux apparatus with 100 parts of iron turnings, 20 parts of water and 3 parts of concentrated hydrochloric acid. 3 parts of sodium carbonate are added to the mixture and the 2-amino-3-methoxy-diphenylene oxide formed is extracted by means of methanol. There are obtained 48 parts of the base melting at 92° C. to 93° C.

(3) By substituting in Example 2 for the 3-methoxy-diphenylene oxide the 3-ethoxy-diphenylene-oxide (obtainable by ethylation of 3-hydroxy-diphenylene oxide with diethylsulfate in an alkaline solution, a colorless oil which boils under a pressure of 12 mm. at 180° C.) the 2-nitro-3-ethoxy-diphenylene oxide is obtained in an analogous manner in the form of yellow needles melting at 137° C. to 138° C. By reduction, as indicated in Example 1, there is obtained therefrom the 2-amino-3-ethoxy-diphenylene oxide melting at 74° C. to 75° C.

(4) 28 parts of 7-methyl-3-hydroxydiphenylene oxide, easily obtainable according to Example 3 of the co-pending U. S. application Serial No. 120,826 above referred to, are stirred on the steam bath with 30 parts of water and 35 parts of caustic soda solution of 40° Bé. and to the melt there are added, drop by drop, in a reflux apparatus 26 parts of dimethylsulfate. Thereupon, the whole is heated for one hour and then diluted with cold water. The separated methyl ether is filtered with suction and thoroly washed. The 7-methyl-3-methoxy-diphenylene oxide boils under a pressure of 3 mm. at 138° C. to 139° C. and melts, when recrystallized from methanol, at 49° C. to 51° C.

50 parts of 7-methyl-3-methoxy-diphenylene oxide are stirred with 250 parts of chlorobenzene and 50 parts of nitric acid of specific gravity 1.4. The temperature of the reaction mixture rises to about 50° C., the reaction is then finished. After cooling, the separated 7-methyl-2-nitro-3-methoxy-diphenylene oxide is filtered with suction and washed with water until neutral. 50 parts of pure nitro-compound are directly obtained. It melts at 170° C. to 171° C. By reduction there is obtained therefrom the 7-methyl-2-amino-3-methoxydiphenylene oxide melting at 117° C. to 118° C.

In an analogous manner there are obtained from the 7-chloro-3-hydroxy-diphenylene oxide by way of the 7-chloro-3-methoxydiphenylene oxide, melting at 83° C.–84° C., the 7-chloro-2-nitro-3-methoxydiphenylene oxide which melts at 207° C. to 208° C. and the 7-chloro-2-amino-3-methoxydiphenylene oxide which melts at 168° C. to 169° C.

(5) 66 parts of 3.7-dimethoxy-diphenylene oxide (colorless crystals melting at 110° C. to 111° C., obtainable by methylation of the 3.7-dihydroxy-diphenylene oxide or 7-methoxy-3-hydroxy-diphenylene oxide, easily accessible according to Examples 5 and 6 of the above-named co-pending U. S. patent application) are dissolved in 300 parts of hot glacial acetic acid, reprecipitated in a finely divided state by cooling and nitrated at 10° C. by adding, drop by drop, while stirring, a mixture of 32 parts of nitric acid of specific gravity 1.4 and 30 parts of glacial acetic acid. When the reaction is finished, the separated nitro-compound is filtered with suction and washed with glacial acetic acid and methanol. 70 parts of the nitro-compound melting at 172° C. to 173° C. are obtained, the melting point does not change even by recrystallization. The compound probably represents the 2-nitro-3.7-dimethoxy-diphenylene oxide. By reduction the 2-amino-3.7-dimethoxy-diphenylene oxide, melting at 133° C. to 134° C., is obtained therefrom.

(6) By replacing in Example 4 the 7-methyl-3-hydroxy-diphenylene oxide by the 6-methyl-3-hydroxy-diphenylene oxide accessible according to Example 8 of the co-pending U. S. patent application above mentioned, the 6-methyl-2-amino-3-methoxy-diphenylene oxide is obtained by way of 6-methyl-3-methoxy-diphenylene oxide which crystallizes from cyclohexane in the form of colorless needles melting at 57° C. to 58° C., and of the 6-methyl-2-nitro-3-methoxy-diphenylene oxide which crystallizes from chlorobenzene in the form of yellow needles melting at 177° C. to 178° C. The base crystallizes from methanol in the form of colorless crystals melting at 137° to 138° C.

We claim:
1. The process which comprises nitrating 3-alkoxy-diphenylene oxides of the following general formula:

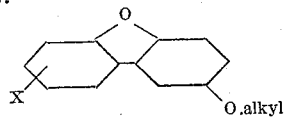

wherein X stands for a member of the group consisting of hydrogen, chlorine, methyl and alkoxy, and reducing the 2-nitro-3-alkoxy-diphenylene oxide compounds obtained to the corresponding 2-amino-3-alkoxy-diphenylene oxide compounds.

2. The process which comprises nitrating 3-methoxy-diphenylene oxide of the following formula:

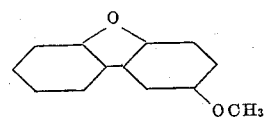

and reducing the 2-nitro-3-methoxy-diphenylene oxide obtained to the corresponding 2-amino-3-methoxy-diphenylene oxide.

3. The compounds of the following general formula:

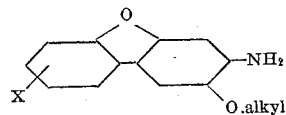

wherein X standing in one of the positions 6 and 7 means a member of the group consisting of hydrogen, chlorine, methyl and alkoxy, being colorless crystallized compounds which form well crystallized hydrochlorides and which can easily be diazotized.

4. The compound of the following formula:

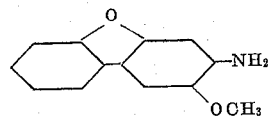

crystallizing in the form of colorless crystals melting at 92° C. to 93° C.

5. The compound of the following formula:
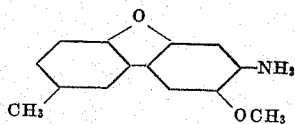
crystallizing from methanol in the form of colorless crystals melting at 137° C. to 138° C.
6. The compound of the following formula:
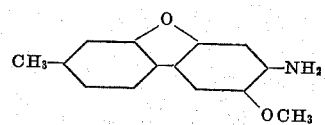
crystallizing in the form of colorless crystals melting at 117° C. to 118° C.
KARL ZAHN.
KURT SCHIMMELSCHMIDT.